US005678233A

United States Patent [19]

Brown

[11] Patent Number: 5,678,233
[45] Date of Patent: Oct. 14, 1997

[54] METHOD OF IMMOBILIZING TOXIC OR RADIOACTIVE INORGANIC WASTES AND ASSOCIATED PRODUCTS

[76] Inventor: Paul W. Brown, 352 E. Irvin Ave., State College, Pa. 16801

[21] Appl. No.: 306,515

[22] Filed: Sep. 14, 1994

[51] Int. Cl.$^6$ .................................................. G21F 9/00
[52] U.S. Cl. ........................... 588/2; 588/13; 588/256
[58] Field of Search ............................. 588/2, 13, 15, 588/26

[56] References Cited

U.S. PATENT DOCUMENTS

| | | | |
|---|---|---|---|
| 3,032,497 | 5/1962 | Rhodes et al. | 210/38 |
| 4,172,807 | 10/1979 | Larker | 252/301.1 W |
| 4,442,028 | 4/1984 | Wolf et al. | 252/628 |
| 4,537,710 | 8/1985 | Komarneni et al. | 252/628 |
| 4,612,053 | 9/1986 | Brown et al. | 706/35 |
| 4,671,882 | 6/1987 | Douglas et al. | 210/720 |
| 4,707,273 | 11/1987 | Halterman et al. | 210/724 |
| 4,737,356 | 4/1988 | O'Hara et al. | 423/659 |
| 4,847,008 | 7/1989 | Boatner et al. | 252/629 |
| 4,880,610 | 11/1989 | Constantz | 423/305 |
| 4,902,427 | 2/1990 | Szczepanik | 210/484 |
| 4,917,802 | 4/1990 | Fukaya et al. | 210/605 |
| 5,047,031 | 9/1991 | Constantz | 606/77 |
| 5,053,212 | 10/1991 | Constantz et al. | 423/305 |
| 5,129,905 | 7/1992 | Constantz | 606/76 |
| 5,178,845 | 1/1993 | Constantz et al. | 423/305 |
| 5,495,064 | 2/1996 | James et al. | 588/256 |
| 5,512,702 | 4/1996 | Ryan et al. | 588/256 |

OTHER PUBLICATIONS

J. C. Cunnane et al., *High-Level Nuclear-Waste Borosilicate Glass: A Compendium of Characteristics*, pp. 225–232, 1993, Mat. Res. Soc. Symp. Proc., vol. 294.

R. R. Seitz et al., *Near-Field Performance Assessment for the Saltstone Disposal Facility*, pp. 731–736, Mat. Res. Soc. Symp. Proc., vol. 294.

H. T. Weger et al., *Bulk Solubility and Speciation of Plutonium (VI) in Phosphate-Containing Solutions*, pp. 739–745, 1993, Mat. Res. Soc. Symp. Proc., vol. 294.

R. Gauglitz et al., *Immobilization of Actinides by Hydroxylapatite*, pp. 567–573, 1992, Mat. res. Soc. Symp. Proc., vol. 257.

R. Atabek et al., *Nuclear Waste Immobilization in Cement-Based Materials: Overview of French Studies*, pp. 3–14, 1990, Mat. Res. Soc. Symp. Proc., vol. 176.

*Solid Waste Leaching Procedure Manual (SW-924)*, pp. i–viii and 1–52, Mar. 1984, U.S. Environmental Protection Agency.

D. M. Roy et al., *Crystal Chemistry, Crystal Growth, and Phase Equilibria of Apatites*, pp. 185–239, 1978, Crystal Chemistry, Academia Press.

*Primary Examiner*—Ngoclan Mai
*Attorney, Agent, or Firm*—Arnold B. Silverman; Eckert Seamens Cherin & Mellott, LLC

[57] ABSTRACT

The present invention discloses a method of creating a monolithic wasteform consisting of a binder which chemically immobilizes heavy metals and radioactive materials so as to render them environmentally safe. An apatite or apatite-like material may be employed in immobilizing the hazardous material. A preferred practice of the invention employs a hydroxyapatite or a calcium depleted hydroxyapatite into which the waste materials are substituted and immobilized. The stoichiometric apatite or calcium deficient hydroxyapatite may be formed in the aqueous solution containing heavy metals or radioactive materials, or both, wherein binding of the latter is effected. Alternatively, a preformed calcium deficient phosphate may be introduced into the solution having heavy metals or radioactive materials, or both, dissolved therein in effecting the desired binding in situ. A high strength monolithic wasteform which may be stored or buried for long-term, safe storage of the hazardous materials is produced.

51 Claims, No Drawings

METHOD OF IMMOBILIZING TOXIC OR RADIOACTIVE INORGANIC WASTES AND ASSOCIATED PRODUCTS

BACKGROUND OF THE INVENTION

1. Field of the Invention

The present invention provides a method of immobilizing hazardous inorganic wastes for prolonged storage in a monolithic product created by the method. The invention, more particularly, relates to the use of apatitic crystalline structures in achieving these objectives and the resultant wasteform.

2. Description of the Prior Art

In recent years, there has been substantial concern about the deleterious effects on people, animals, and the environment of hazardous waste. This has resulted in major efforts to find ways of neutralizing or, otherwise, rendering harmless such waste.

The United States government statutes and regulations have provided legal standards for disposal of toxic inorganic wastes in such a manner as to preclude their entry into the ambient environment. The United States Department of Energy nuclear complex has directed substantial attention to such waste problems. Similarly, numerous states have laws dealing with this subject.

Among the particularly troublesome materials in respect of stable disposal, are the toxic heavy metals. Wastes of this type may occur in various physical forms including aqueous solutions, metal salts in sludge cakes, and metals intermixed with soils. Such hazardous metals must be concentrated and bound in a wasteform suitable for storage or permanent burial. Among the more prominent wasteforms are borosilicate glass and Portland cement-based grouts. In the case of glass, the waste is blended into ingredients that are melted at high temperature, molded into a convenient shape, and solidified. Grout formation is a low temperature process in which waste is mixed with Portland cement and ingredients, such as fly ash. A criterion by which a heavy metal immobilization method is considered suitable is that the wasteform pass the Toxic Compound Leach Procedure (TCLP) prescribed by the United States Environmental Protection Agency. See U.S. EPA, Solid Waste Leaching Manual (SW-924), Cincinnati, Ohio (1985).

A national repository for planned burial of high-level hazardous wastes stemming from weapons production and spent nuclear reactor fuel has been built underground in New Mexico, selected on account of the low risk of water ever seeping into the repository, contacting and solubilizing the wasteform and freeing the hazardous substances to migrate. Chemical durability that will resist leaching and dissolution for several centuries and millennia into the future is a key requirement. The tests and criteria were established by the United States D.O.E., Environmental Protection Agency, and the Nuclear Regulatory Agency.

Calcium phosphate materials known as apatites are naturally occurring minerals. The formula for stoichiometric apatite is $Ca_{10}(PO_4)_6F_2$. One specie of the generic class of apatite compounds is hydroxyapatite which is defined as $Ca_{10}(PO_4)_6(OH)_2$.

It has been known to employ hydroxyapatite in connection with medical devices employable as synthetic bones or prostheses in the orthopedic medical field. See, generally, U.S. Pat. Nos. 4,612,053; 4,880,610; 5,047,031; 5,053,212; 5,129,905; and 5,178,845. Use of these materials in the medical environment does not involve reactants which are toxic. Also, the use in these prior art patents was directed toward establishing a composition similar to that of human bone.

Roy et al. "Crystal Growth and Phase Equilibria of Apatites," Crystal Chemistry, pp. 185–239, Academic Press (1978), discloses substitutions made in a hydroxyapatite structure.

It has been previously suggested to employ calcium phosphates in respect of various aspects of environmental restoration.

Gauglitz et al. discloses immobilizing uranium and thorium by adding preexisting hydroxyapatites to brines containing various salts to form saleeite and metaautunite from power plant waste. See "Immobilization of Actinides by Hydroxylapatite," MRS Symp. Proc. 257, pp. 567–573 (1991).

U.S. Pat. No. 4,671,882 discloses a phosphoric acid/lime hazardous waste detoxification treatment process wherein heavy metals are precipitated from aqueous solutions by forming a sludge which is designated as non-hazardous. This process involves the acidification of $H_3PO_4$ or acidic phosphate salts, adjusting the pH, adding a coagulant, adjusting the pH, and using a calcium source as dewatering. See, also, U.S. Pat. No. 4,707,273 which is directed toward manganese removal from aqueous industrial waste effluents. The manganese removal and removal of other heavy metals is said to be accomplished by acidification and phosphate addition followed by raising the pH and adding calcium. A calcium-manganese-phosphate complex is said to be precipitated in the presence of fluoride. It discloses precipitation of $Ca_3(PO_4)_2CaF_2$ and $CaF_2$.

U.S. Pat. No. 4,442,028 discloses precipitation of hydroxyapatite as a powder by adding $H_3PO_4$ and then $Ca(OH)_2$ to a heavy metal-containing liquid with the powder being introduced into Portland cement.

U.S. Pat. No. 4,737,356 discloses immobilization of lead and cadmium in solid residues from the combustion of refuse employing lime and phosphate. It discloses the addition of water-soluble phosphate, such as phosphoric acid to decrease solubilities of lead and cadmium. Ash from a flue gas scrubber, which is typically high in calcium content, is employed.

U.S. Pat. No. 4,442,028 discloses combining radioactive phosphoric acids with $Ca(OH)_2$ to form hydroxyapatite granules which are mixed with Portland cement to form a concrete. See, also, U.S. Pat. Nos. 4,537,710 and 4,847,008 which relate to storage of radioactive material. The latter patent discloses the use of lead-phosphate glass.

The use of borosilicate glass in vitrification of high-level nuclear waste is disclosed in Cunnane et al., "High-Level Nuclear Waste Borosilicate Glass: A Compendium of Characteristics," Vol. 294, Nat. Res. Sec. Symp. Proc. (1993). Storage of low-level radioactive waste in saltstone containing grout in vaults is disclosed in Seitz et al., "Near-Field Performance Assessment for the Saltstone Disposal Facility," Vol. 294, Mat. Res. Soc. Symp. Proc. (1993).

The solubility and speciation of plutonium (VI) in phosphate solutions is disclosed in "Bulk Solubility and Speciation of Plutonium (VI) in Phosphate-Containing Solutions," Vol. 294, Mat. Res. Soc. Symp. Proc. (1993).

U.S. Pat. No. 4,902,427 relates to a filter for removing heavy metals from drinking water and employs bone char to remove heavy metals by ion exchange wherein hydroxyapatite is employed as an ion exchange medium. See, also, Gauglitz et al., "Immobilization of Actinides By Hydroxylapatite," MRS Symp. Proc. 257, pp. 567-573 (1992), wherein it is indicated that the use of large enough quantities of hydroxyapatite as an ion exchanger reduced the content of heavy metals.

Treating waste water by precipitating hydroxyapatite as a method for removing phosphorous compounds from waste water is disclosed in U.S. Pat. No. 4,917,802. The method involves extracting calcium from calcium silicate hydrates in hydroxyapatite formation.

U.S. Pat. No. 3,032,497 discloses removal of strontium ions by means of ion exchange from an aqueous solution wherein hydroxyapatite is formed in the reaction.

It has been suggested that evaporator wastes containing sodium phosphates may be reacted with Portland cement and establish hydroxyapatite. Atabek et al., "Nuclear Waste Immobilization in Cement-Based Materials: Overview of French Studies," Sci. Basis for Nucl. Waste Management—XIII, MRS Vol. Proc. 176, pp. 3-14 (1990). The formation of hydroxyapatite by salt precipitation has been known. Such procedures produce a hydroxyapatite which is either in powder or gel form.

In spite of the foregoing disclosures, there is lacking in the prior art a teaching of an economic means for safe and effective disposal of large streams of toxic heavy metal waste and radioactive waste in a durable ceramic form which may readily be stored or buried for indefinite periods of time without meaningful risk of exposure to the ambient environment. There is also lacking a method for establishing monolithic storage structures within which the heavy metals have been trapped and wherein an apatite or apatite-like material has been employed as a binder in enclosing material. There is further lacking such a system wherein the potentially hazardous heavy metals and radioactive materials may be so entrapped in situ with resultant wasteform being monolithic in physical structure.

SUMMARY OF THE INVENTION

The present invention has met the above-described needs by providing an effective method for creating a wasteform immobilizing heavy metals, arsenic and radioactive material and it also provides the related wasteform.

In one embodiment, a heavy metal wasteform is created by providing at least one calcium phosphate precursor which is introduced into an aqueous solution containing at least one heavy metal. The precursor introduction is effected in sufficient stoichiometric quantities to create an apatitic calcium phosphate which immobilizes the heavy metals to create a monolithic apatitic crystalline wasteform. The apatitic calcium phosphate is preferably hydroxyapatite. In another embodiment of the method, a calcium deficient apatite is introduced into an aqueous solution of toxic heavy materials and interacts with the heavy metals to immobilize the same on the calcium deficient sites, thereby creating the desired wasteform. In the alternative or, in addition, the calcium deficient apatite may be formed in the solution.

In another embodiment of the invention, the calcium phosphate precursor is employed to create a calcium phosphate apatite which, preferably, is hydroxyapatite. The calcium phosphate apatite is subsequently introduced into an aqueous solution containing heavy metals to thereby immobilize the heavy metals and create the desired monolithic wasteform construction.

The solid wasteform of the present invention comprises an apatitic binder which is preferably hydroxyapatite binder having predominantly crystal structure with heavy metals chemically bonded within the lattice of the apatitic binder and the wasteform being characterized by strong resistance to leaching of the hazardous metals.

The invention also contemplates making an inorganic filtration media, by introducing into a heavy metal solution, containing at least one of (a) hydroxyapatite and (b) calcium deficient hydroxyapatite having a monolithic form of high porosity whereby the monolithic formation may serve as an ion exchanger in treating liquid waste streams.

It is an object of the present invention to provide a method of employing an apatite, such as an hydroxyapatite, in establishing a monolithic structure which effectively entraps hazardous waste, such as heavy metals and radioactive materials with particular emphasis on radioactive waste and while providing an enclosure of enhanced chemical durability.

It is a further object of the present invention to employ an apatite or apatite-like material which may be selected to produce a low solubility wasteform capable of safe, long-term storage.

It is a further object of the present invention to provide such a method wherein the method creates a monolithic apatite-type enclosure for chemically bonded heavy metals and radioactive materials such that it has desired mechanical properties and extended stability during storage is provided.

It is a further object of the present invention to provide such a system which may employ stoichiometric hydroxyapatite or calcium deficient hydroxyapatite in the process.

It is a further object of the invention to provide such a system which can remove a wide variety of ionic species.

It is a further object of the present invention to provide such a system wherein a hydroxyapatite material serves as a binder for toxic heavy metals to create a crystal wasteform structure which may be stored or permanently buried in the earth for safe, prolonged storage.

It is a further object of the present invention to facilitate creating a wasteform at ambient temperature and pressure.

It is a further object of the present invention to produce a heavy metal entrapped hydroxyapatite monolithic wasteform which is thermodynamically stable and resists decomposition.

It is another object of the present invention to provide a monolithic wasteform which may function as an ion exchanger.

It is another object of the present invention to provide such a monolithic structure which is stable at near neutral and slightly acidic pH values.

It is yet another object of the present invention to provide such a system which will also immobilize heavy metals having more than a single valence regardless of whether they are anions, cations, oxyanions or oxycations.

It is a further object of the present invention to create such a wasteform which effectively resists leaching of hazardous materials therefrom.

These and other objects of the invention will be more fully understood on reference to the following disclosure of the preferred embodiments.

DESCRIPTION OF THE PREFERRED EMBODIMENTS

There are numerous ways in which unsubstituted hydroxyapatite can be prepared from solid calcium phosphate precursors or from similar compounds. The following reactions illustrate the formation of unsubstituted stoichiometric hydroxyapatite and of calcium deficient hydroxyapatite each of which can be employed alone or in combination to immobilize toxic heavy metals, arsenic and radioactive waste in a solid monolithic wasteform.

Apatitic calcium phosphates of low solubility in ground water or rain water can be produced in monolithic form by the reaction of one or more solid calcium phosphate precursors. These reactions are achieved by dissolution and subsequent precipitation. These reactions can be achieved by an acid-base reaction or by direct hydrolysis.

In reactions 1 through 10, acid-base reactions are employed.

(1) $2CaHPO_4 + 2Ca_4(PO_4)_2O \xrightarrow{H_2O} Ca_{10}(PO_4)_6(OH)_2$
monetite — stoichiometric hydroxyapatite (2) $6CaHPO_4 + 3Ca_4(PO_4)_2O \xrightarrow{H_2O} 2Ca_9(HPO_4)(PO_4)_5OH + H_2O$
calcium deficient hydroxyapatite As will be known to those skilled in the art, reactions (1) and (2) involve mixing the particulate precursors with sufficient water to provide a medium in which the reactions occur. The weight ratio of water-to-solid may, for example, be on the order of 0.4. Typically, the lower limit, which may be about 0.2, is determined by the ability to mix the reactants homogeneously. The upper limit, which may be on the order of 3.0, is determined by the ability to form a monolith. These amounts may vary with the particle size of the reactants and the reactions of interest. The reactions will generally take place at any temperature above freezing, but may preferably be carried out at ambient temperature.

(3) $2CaHPO_4 \cdot 2H_2O + 2Ca_4(PO_4)_2O \xrightarrow{H_2O} Ca_{10}(PO_4)_6(OH)_2 + H_2O$
brushite — stoichiometric hydroxyapatite (4) $6CaHPO_4 \cdot 2H_2O + 3Ca_4(PO_4)_2O \xrightarrow{H_2O}$
$2Ca_9(HPO_4)(PO_4)_5OH + 13H_2O$
calcium deficient hydroxyapatite (5) $2Ca(H_2PO_4)_2 + 7Ca_4(PO_4)_2O \xrightarrow{H_2O} Ca_{10}(PO_4)_6(OH)_2$
stoichiometric hydroxyapatite (6) $Ca(H_2PO_4)_2 + 2Ca_4(PO_4)_2O \xrightarrow{H_2O} 2Ca_9(HPO_4)(PO_4)_5OH + H_2O$
calcium deficient hydroxyapatite (7) $2Ca(H_2PO_4)_2 \cdot H_2O + 7Ca_4(PO_4)_2O \xrightarrow{H_2O} Ca_{10}(PO_4)_6(OH)_2$
stoichiometric hydroxyapatite (8) $Ca(H_2PO_4)_2 \cdot H_2O + 2Ca_4(PO_4)_2O \xrightarrow{H_2O} 2Ca_9(HPO_4)(PO_4)_5OH + H_2O$
calcium deficient hydroxyapatite (9) $6H_3PO_4(\text{solid}) \text{ or } H_3PO_4 \cdot 1/2H_2O(\text{solid}) + 9Ca_4(PO_4)_2O \xrightarrow{H_2O}$
$2Ca_9(HPO_4)(PO_4)_5OH + H_2O$
calcium defidient hydroxyapatite

(10) $2H_3PO_4(\text{solid}) \text{ or } H_3PO_4 \cdot 1/2H_2O.(\text{solid}) + 5Ca_4(PO_4)_2O \xrightarrow{H_2O}$
$Ca_{10}(PO_4)_6(OH)_2$
stoichiometric hydroxyapatite It will be appreciated by those skilled in the art that with respect to reactions 1 through 10, other sources of calcium, such as CaO, Ca(OH)$_2$, or CaCO$_3$ or other sources of calcium can be partially substituted for $2Ca_4(PO_4)_2O$ provided that the stoichiometry is adjusted in a manner known to those skilled in the art.

The direct hydrolysis reactions involve reaction with water to provide a calcium deficient hydroxyapatite as shown in reaction 11. Hydrolysis of tricalcium phosphate (includes α, β, α' polymorphs).

(11) $3Ca_3(PO_4)_2 + H_2O \rightarrow Ca_9(HPO_4)(PO_4)_5OH$
tricalcium phosphate One may also hydrolyze monetite and brushite to calcium deficient hydroxyapatite at high dilution to dilute excess phosphate produced under basic conditions.

Reactions 12 and 13 show ways of obtaining stoichiometric hydroxyapatite through the hydrolysis of oxyapatite.

In reaction 12, the reaction product is hydroxyapatite and, in reaction 13, the reaction product is hydroxyapatite plus calcium hydroxide.

Reaction 12 shows hydrolysis of oxyapatite having a Ca/P ratio as stoichiometric hydroxyapatite:

(12) $Ca_{10}(PO_4)_6O + H_2O \rightarrow Ca_{10}(PO_4)_6(OH)_2$
in the hydroxyapatite structure Hydrolysis of oxyapatite having a Ca/P ratio of 1.84 is shown in reaction 13:

(13) $Ca_{11}(PO_4)_6O_2 + 2H_2O \rightarrow Ca_{10}(PO_4)_6(OH)_2 + Ca(OH)_2$
in the hydroxyapatite structure Reaction 14 shows hydrolysis of oxyapatite having a Ca/P ratio as calcium deficient hydroxyapatite:

(14) $Ca_9(PO_4)_6 + H_2O \rightarrow Ca_9(HPO_4)(PO_4)_5OH$
in the hydroxyapatite structure Reaction 15 shows the production of stoichiometric hydroxyapatite by hydrolysis of tetracalcium phosphate. If desired, reaction 15 can be employed with mixtures of $3Ca_4(PO_4)_2O$ and CaO being employed in lieu of $6Ca_4(PO_4)_2O$ and can be hydrolyzed to produce more Ca(OH)$_2$.

Also with reference to reaction 15, in addition to the hydrolysis of tetracalcium phosphate, other hydrated calcium phosphates having a Ca/P ratio of 2 may be employed.

(15) $6Ca_4(PO_4)_2O + 6H_2O \rightarrow 2Ca_{10}(PO_4)_6(OH)_2 + 4Ca(OH)_2$
stoichiometric hydroxyapatite With reference to reactions 13 and 15, it will be appreciated that both of these reactions provide a buffering action. With respect to reaction 15, hydrolysis of tetracalcium phosphate in the presence of cations will generate Ca(OH)$_2$. The Ca(OH)$_2$ from either reaction provides reserve alkalinity to the wasteform. This buffering capability can have a beneficial effect in reducing solubility in the wasteform. When the reactions take place in the presence of CaF$_2$, the F substitutes for the hydroxyl to create CaF$_2$ which both buffers the system and increases the apatite stability. These approaches permit the processes to provide intrinsic buffering.

As will be discussed in detail hereinafter, in achieving removal of heavy metal ions from moist soil or solutions either substitution within stoichiometric hydroxyapatite or the use of calcium deficient hydroxyapatite may be employed in order to chemically bind the heavy metals and employ the hydroxyapatite as a binder. This approach can be employed to establish a monolithic structure as distinguished from prior powder or gel forms of hydroxyapatite. The monolithic structure is adapted to be stored or permanently buried and serve to resist undesired leaching of the heavy metals into surrounding soil for an extended period of years.

Reactions 1 through 15 all involve the use of orthophosphates, i.e., $PO_4$ groups. In lieu of using the $PO_4$ groups, pyrophosphates, which contain $P_2O_5$ groups may also be employed in forming hydroxyapatite. Pyrophosphates of fixed composition include $2CaO \cdot P_2O_5$, $CaO \cdot P_2O_5$, and $CaO \cdot 2P_2O_5$. For example, such an approach is shown in Equation (1A).

$$(1A) \quad 2CaO \cdot P_2O_5 + 2Ca_4(PO_4)_2O \xrightarrow{H_2O} Ca_{10}(PO_4)_6(OH)_2$$

Also usable are compositions in the range of tromelite stability. If desired, acidic glasses could be employed.

Among other materials that may be employed as calcium phosphate precursors are at least one material selected from the group consisting of $CaO \cdot P_2O_5$, $CaHPO_4$, $CaHPO_4 \cdot 2H_2O$, $Ca_4(PO_4)_2O$, $Ca(H_2PO_4)_2 \cdot H_2O$, $Ca(H_2PO_4)_2$, $H_3PO_4$, $H_3PO_3 \cdot \frac{1}{2}H_2O$, $CaO$, $CA(OH)_2$, calcium phosphate glasses and $CaCO_3$.

It will be appreciated from the foregoing that there are numerous ways of efficiently and economically producing hydroxyapatite materials from solid calcium phosphate precursors.

The term "heavy metals" as employed herein shall include barium, cadmium, chromium, copper, iron, lead, manganese, nonradioactive strontium, uranium$^{238}$, vanadium and zinc. For purposes of the present application, arsenic will also be deemed to be a "heavy metal."

"Radioactive materials" shall include cesium$^{137}$, cobalt$^{60}$, iodine, plutonium, strontium$^{90}$, thorium and uranium.

The term "apatite" as employed herein, shall mean $Ca_{10}(PO_4)_6F_2$.

The term "apatite-like material" shall mean a material having the formula $A_{10}(MO_4)_6X_2$ and shall include apatite and material having A as a monovalent, divalent, trivalent or tetravalent cation or oxycation, M being a multivalent cation and X being selected from the group consisting of $OH$, $F$, $Cl$, $Br$, $I$, $O$, $CO_3$, $S$, $NO_2$, $NO_3$, and $CN$.

As used herein, the term "hazardous material" means (a) a heavy metal or (b) a radioactive material, or (c) any combination of (a) and (b) which is either in ionic form or will become ionic if solubilized by an aqueous solution.

The formula for stoichiometric hydroxyapatite is $Ca_{10}(PO_4)_6OH_2$. There are within these hydroxyapatite compounds a number possibilities for substitution. For example, cations and oxycations could be substituted in the Ca sites, oxyanions could be substituted in the $PO_4$ sites, and anions in the OH sites. This could involve, for example, cadmium or lead being substituted for calcium, $AsO_4$ being substituted at the $PO_4$ sites and fluorine or iodine for the hydroxy site as $I^-$ or $IO_{3-}$, for example.

One of the advantages of the present invention is the fact that the heavy metals and hydroxyapatite binders are integrated into a monolithic wasteform ready for storage or burial and permanent disposal. The monolithic wasteform is predominantly apatitic in crystal structure.

One method of the present invention for sequestering waste in situ involves the reaction of precursors in the presence of heavy metals and/or radioactive waste in an aqueous solution to produce stoichiometric substituted hydroxyapatite. During the reaction, the hazardous heavy metal ions are substituted into lattice sites with the apatite structure thereby removing them from solution and holding them captive employing the hydroxyapatite as a binder. Equation 16 is an example of such a reaction.

$$CaHPO_4 + 2Ca_4(PO_4)_2O + Pb^{2+} + 2OH^- \rightarrow Ca_9Pb(PO_4)_6(OH)_2 + Ca^{2+} + 2OH^- \quad (16)$$

In this example, a lead-substituted apatite is formed by the reaction of solid precursors $CaHPO_4$ and $Ca_4(PO_4)_2O$. In reaction forming apatite in the presence of lead dissolved in aqueous solution, the precursors are dissolved and the Pb substituted monolithic apatite forms. Because Pb is substituted into the apatite structure during the apatite formation, it is thereby removed from the aqueous solution. Other means of creating lead apatite may he employed. For example, reaction (17) could also be used to form Pb apatite.

$$4CaHPO_4 + Ca_4(PO_4)_2O + 2Pb^{2+} + 4OH^- \rightarrow Ca_8Pb_2(PO_4)_6(OH)_2 + H_2O \quad (17)$$

Varying proportions of Pb can be incorporated by adjusting the proportions of the solid reactants.

Heavy metals have been introduced in the Ca site and $AsO_4$ and $VO_4$ have been introduced in the $PO_4$ and fluorine and iodine have been introduced in the OH site. This confirms the operability of the present invention in respect of substituting hazardous heavy metals contained in the liquid solution when forming the apatitic structure.

The hazardous elements immobilized by the present system are either ions or will become ions if solubilized by an aqueous solution.

The reactions by which these ions are incorporated into the apatite structure are cementitious in that they result in the formation of a solid hardened monolith as opposed to a powder, or a slurry. Unlike the conventional Portland cement-based formulations used in grout formation or the borosilicate glasses formed in waste vitrification, however, the apatite products formed are thermodynamically stable. Also, the apatites formed by the process of the present invention do not decompose at near neutral or slightly acidic pH values. It is preferred to employ the monolithic wasteform of the present invention in an environment having a pH of at least about 4.0 and preferably at about 4 to 12.6.

The reaction results in the heavy metal cations, oxyanions or oxycations being chemically incorporated into the structures of the solids that form, thereby removing them from the solution.

In lieu of preparing a stoichiometric hydroapatite in situ in the aqueous solution, an alternate approach is to prepare a pre-existing calcium deficient hydroxyapatite for use as a heavy metal host. In the calcium deficient hydroxyapatite, up to approximately one calcium per formula unit is missing from the lattice, thereby providing a host site for incorporating the heavy metal ions from a waste solution upon mixing the calcium deficient hydroxyapatite therewith. This method has also been employed successfully with uranium.

$$Ca_9(HPO_4)(PO_4)_5OH + Pb^{2+} + 2OH^- \rightarrow Ca_9Pb(PO_4)_6(OH)_2 + H_2O \quad (18)$$

Equation 18 shows an example of the use of a calcium deficient hydroxyapatite employed to incorporate lead therein, wherein the lead in the form of $Pb^{2+}$ is secured to the host site within the calcium deficient hydroxyapatite lattice.

When an apatite-like material of the formula $A_{10}(MO_4)_6X_2$, the stoichiometric apatite-like material formation in situ may be employed in the context herein defined substitutions. Also, in respect of the deficient approach, whether preformed and introduced into the solution or formed in situ in the solution, a deficiency at the A position is contemplated.

The apatitic precursors can be proportioned so as to take up increased amounts of metal per formula unit. This facilitates increased or even full substitution for the calcium phosphate and hydroxyl components of hydroxyapatite. An example of a complete substitution at all three sites by hazardous metals is $PbVO_4$ iodate. In this context, the lead would be substituted in the calcium site, the $VO_4$ would be substituted in the $PO_4$ site and the iodate would be substituted at the hydroxy site.

The apatite-like material of the present invention has the formula $A_{10}(MO_4)_6X_2$. The A site occupants include at least one material selected from the group consisting of: (a) monovalent ions—cesium, sodium, potassium, rubidium and tellurium; (b) divalent ions—calcium, cadmium, barium, europium, iron, lead, manganese magnesium, nickel, tin, strontium, and uranium; (c) trivalent ions—bismuth, scandium, tellurium, yttrium and vanadium; (d) tetravalent ions—cerium and thorium, the other members of the genus actinides (Atomic Nos. 90–103) and the other members of the genus lanthanons (Atomic Nos. 57–71). The M site occupants include at least one of the following materials: aluminum; arsenic; boron; chromium; germanium; manganese; phosphorous; silicon; and sulfur.

The X site occupants include at least one of the following materials: bromine; carbon trioxide; chlorine; CN; fluorine; hydroxyl; iodine; nitric oxide; nitrous oxide; oxygen; and sulfur.

In a broader aspect of the invention, the apatite-like materials may be employed to immobilize heavy metals, radioactive materials and arsenic by introducing an A depleted material into an aqueous solution containing one or more of these hazardous materials or forming an A depleted material in the aqueous solution or forming a stoichiometric apatite-like material in situ in the aqueous solution containing the hazardous material. A deficient apatite-like material will have an open binding site at position A, M or X.

Another significant aspect of the present invention is the construction of a particular wasteform involving removal of heavy metals from solution by use of a hydroxyapatite structure. Known prior art hydroxyapatite prepared as an end product by conventional immobilization methods is not monolithic. It is a powder or gel which does not exhibit adequate mechanical properties as a final wasteform. The hydroxyapatite-based wasteform of the present invention is capable of being shaped into pre-cast monoliths of sizes and shapes analogous to those formed by conventional cement forming methods, but having enhanced mechanical properties, such as greater compressive strength than Portland cement. Compressive strengths in cast cubes of the present invention have been measured to the range of about 1 to 170 MPa (megapascals) depending upon the specific precursors selected and the proportion of mixing solution used. The monoliths of the present invention may be of any desired size and may be cast with a maximum dimension of several meters or more, if desired. The liquid-solid proportions of the aqueous solution and the solid precursor may be adjusted to alter mechanical properties. The more liquid employed, the higher porosity of the monolith and the lower the monolith strength in compression. The lower limit of strength, e.g. 1 MPa was achieved with monolith that was about 90 percent porous.

Depending upon the end use requirements, the reactions leading to hydroxyapatite formation can be engineered to occur rapidly, on the order of about 2 to 4 hours, or slowly, on the order of about 2 to 4 weeks at 20° C., depending upon the reactants selected. It will be appreciated that this provides the opportunity to custom-design the monolithic resultant structure based upon the specific parameters involved in the particular process. It is generally preferred that the reactions, by serving to bind the heavy metals, arsenic and radioactive materials, occur above the freezing temperature of the aqueous solutions and preferably at about 10° to 40° C.

If desired, fluoride may be added to a solution containing hydroxyapatite to create fluoride apatite $Ca_{10}(PO_4)_6F_2$. The solubility curve, i.e., the rate at which hazardous material might leach out of the monolith, is slightly lower than that of hydroxyapatite. As is true with hydroxyapatite, solubility is reduced with increasing pH with the preferred pH being in excess of about 4 and the most preferred pH being greater than about 4 to 12.6. In one approach, a basic material, such as $Ca(OH)_2$, may be employed to elevate the pH and $CaF_2$ may be added as a source of fluoride. If desired, this fluoride approach may be employed with or without the use of another apatite, such as hydroxyapatite, or an apatite-like material.

In order to facilitate greater insight into the present invention, a series of examples will be provided.

EXAMPLE I

In a series of experiments, 2 percent by weight of the solid calcium phosphate precursors were mixed in proper proportions to produce hydroxyapatite, $Ca_9HPO_4(PO_4)_5OH$. In this example, a mixture of $CaHPO_4$ and $Ca_4(PO_4)_2O$ having a dry weight of 2 grams was added to 100 ml of solutions containing various heavy metals present in high concentrations. These heavy metals were cadmium, copper, manganese, and lead. This was done in order to determine the upper limits on the uptake of the heavy metals by hydroxyapatite. The heavy metal solutions were prepared by dissolving either their nitrate or chloride salts in water in room temperature. TABLE 1 illustrates the variations in metal concentration with time when the hydroxyapatite precursors were placed in solutions of $CdCl_2$, $CuCl_2$, $MnCl_2$, and $PbCl_2$ having the initial concentrations shown. Concentrations were measured by filtering the solids from the liquids and using direct current plasma spectroscopy to determine the concentrations of heavy metals in the liquids.

TABLE 1

| | Conc. of Dissolved Metal in mg/l | | | |
|---|---|---|---|---|
| | Cd | Cu | Mn | Pb |
| initial | 11450 | 6700 | 6350 | 13900 |
| 1 min | 6400 | 2880 | 2290 | 5500 |
| 1 hour | 6200 | 2880 | 2260 | 5300 |
| 6 hours | 6100 | 2800 | 2190 | 5100 |
| 24 hours | 6200 | 2740 | 2010 | 4700 |

These data indicate very high binding capacities of metal cations by hydroxyapatite. All of these heavy metals were secured to the hydroxyapatite structure by binding to the calcium sites. Comparing the initial and final concentration after 24 hours, the cadmium concentration went from 11450 mg/l to 6200 mg/l. Copper in solution was reduced from 6700 mg/l to 2740 mg/l, manganese concentration was reduced from 6350 mg/l to 2010 mg/l, and lead concentration was reduced from 13900 mg/l to 4700 mg/l.

EXAMPLE II

In this example, a single calcium phosphate was reacted with divalent and trivalent heavy metals provided as chlorides and nitrates. This is done to illustrate that (1) a single calcium phosphate source can be used; (2) heavy metals of more than a single valence can be immobilized; and (3) the nature of the anionic species needed to provide electrostatic neutralization for the heavy metal does not inhibit its sequestration. Quantities of $CdCl_2$, $PbCl_2$, $CrCl_3$, $FeCl_3$, $CuCl_2$, $MnCl_2$ and $Cd(NO_3)_2$, $Pb(NO_3)_2$, $Cr(NO_3)_3$, $Fe(NO_3)_3$ $Cu(NO_3)_2$ and $Mn(NO_3)_2$ were dissolved in distilled water to produce solutions having the initial concentrations (in mg/l) listed in TABLE 2. The solutions are stirred for approximately 24 hours prior to addition of the calcium phosphate to ensure the complete dissolution of the heavy metal salts. The single source calcium phosphate used in this example is tetracalcium phosphate $Ca_4(PO_4)_2O$. Two grams of tetracalcium phosphate are added to 100 ml of each salt solution. The zero time row provides the initial concentrations of the metal salt in the solutions. The remaining data indicate the concentrations in the solutions at 1 minute, 1 hour, 6 hours and 24 hours, respectively. Concentrations were measured by filtering the solids from the liquids and using direct current plasma spectroscopy to determine the concentrations of heavy metals in the liquids.

For trivalent metal cations, the reaction is believed to be that set forth in Equation 20.

$$3Ca_4(PO_4)_2O(s)+MA_3 \rightarrow Ca_{(10-3x/2)}M_x(PO_4)_6(OH,A)_2(s)+12-(10-3x/2)\{CaA_2+Ca(OH)_2\} \quad (20)$$

Both reactions, 19 and 20, are base generating.

EXAMPLE III

In this example, pre-existing calcium deficient hydroxyapatite, $Ca_9HPO_4(PO_4)_5OH$ was reacted with solutions containing heavy metal ions. This is done to illustrate that (1) a single calcium phosphate source can be used, (2) heavy metals of more than a single valence can be immobilized, (3) the nature of the anionic species needed to provide electrostatic neutralization for the heavy metal does not inhibit its sequestration, and (4) heavy metal cations will enter vacant sites in a pre-existing hydroxyapatite structure. Sufficient quantities of $CdCl_2$, $PbCl_2$, $CrCl_3$, $FeCl_3$, $CuCl_2$, $MnCl_2$ and $Cd(NO_3)_2$, $Pb(NO_3)_2$, to produce solutions having the concentrations (in mg/l) listed in the table below prior to the addition of the calcium phosphate (zero time) were employed. The solutions are stirred for approximately

TABLE 2

| | Concentration of Dissolved Metal in mg/l | | | | | | | | | | | |
|---|---|---|---|---|---|---|---|---|---|---|---|---|
| | Cd | | Cr | | Cu | | Fe | | Mn | | Pb | |
| Time | Cl | NO$_3$ | Cl | NO$_3$ | Cl | NO$_3$ | Cl | NO$_3$ | Cl | NO$_3$ | Cl | NO$_3$ |
| 0 | 270 | 255 | 180 | 180 | 180 | 185 | 175 | 160 | 185 | 210 | 215 | 230 |
| 1 min | 170 | 150 | 48 | 10.9 | 150 | 145 | 0.16 | 0.48 | 160 | 160 | 23.8 | 0.43 |
| 1 hr | 135 | 39 | 0.13 | 0.14 | 125 | 26.3 | 0.03 | bld | 135 | 61 | 0.13 | 1.05 |
| 6 hr | 130 | 27.3 | 0.05 | 0.03 | 105 | 0.05 | bld | bld | 125 | 25.1 | bld | 0.17 |
| 24 hr | 125 | 5.5 | 0.02 | 0.02 | 0.54 | bld | 0.06 | 0.02 | 75 | 3.02 | bld | bld | bld = means limit of detection <0.02 mg/l

The tests performed in this example show that for a wide range of salts of heavy metals, the reduction in concentration effected by a single calcium phosphate and the ionic heavy metals was very substantial including several which, after 24 hours were below the limit of detection.

It is believed that the reaction which occurs for divalent metal cations is that set forth in reaction 19 wherein "s" is solid and "x" is the extent of substitution in the apatite. "M" is the heavy metal and "A" is an union which is either Cl or $NO_3$.

$$3Ca_4(PO_4)_2O(s)+MA_2 \rightarrow Ca_{(10-x)}M_x(PO_4)_6(OH,A)_2(s)+12-(10-x)\{CaA_2+Ca(OH)_2\} \quad (19)$$

24 hours prior to addition of the calcium deficient hydroxyapatite to ensure the complete dissolution of the heavy metal salts. The single source calcium phosphate used in this example is tetracalcium phosphate $Ca_4(PO_4)_2O$. Two grams of calcium deficient hydroxyapatite is added to 100 ml of each salt solution. In TABLE 3 the zero time row provides the initial concentrations of the metal salt in the solutions. The remaining data indicate the concentrations in the solutions at 1 minute, 1 hour, 6 hours and 24 hours. Concentrations were measured by filtering the solids from the liquids and using direct current plasma spectroscopy to determine the concentrations of heavy metals in the liquids.

TABLE 3

| | Concentration of Dissolved Metal in mg/l | | | | | | | | | | | |
|---|---|---|---|---|---|---|---|---|---|---|---|---|
| | Cd | | Cr | | Cu | | Fe | | Mn | | Pb | |
| Time | Cl | NO$_3$ | Cl | NO$_3$ | Cl | NO$_3$ | Cl | NO$_3$ | Cl | NO$_3$ | Cl | NO$_3$ |
| 0 | 200 | 270 | 185 | 185 | 195 | 190 | 185 | 180 | 190 | 215 | 240 | 235 |
| 1 min | 2.49 | 2.80 | 95 | 70 | 0.81 | 0.42 | 0.03 | 0.04 | 36 | 38 | bld | bld |
| 1 hr | 0.68 | 0.84 | 1.43 | 4.5 | 0.14 | 0.08 | bld | bld | 16.3 | 18.6 | bld | bld |
| 6 hr | 0.41 | 0.52 | 0.07 | 0.10 | 0.07 | 0.05 | bld | bld | 10.2 | 12.5 | bld | bld |
| 24 hr | 0.25 | 0.36 | 0.07 | 0.09 | 0.05 | 0.04 | 0.02 | bld | 7.7 | 10.0 | bld | bld | bld = below limit of detection <0.02 mg/l

These tests clearly show the effectiveness of hydroxyapatite in removing and binding heavy metals from solution employing both the chloride and nitrate salts.

EXAMPLE IV

In this example, the single source calcium phosphate, $\alpha\text{-}Ca_3(PO_4)_2$ is used. One gram of this calcium phosphate was added to 400 ml of solutions containing $CdCl_2$, $MnCl_2$, and $PbCl_2$. The results are shown in TABLE 4. The reaction between tricalcium phosphate and these solutions is not base generating. It is believed that the reaction is that of reaction 21.

$$3Ca_3(PO_4)_2(s)+MCl_2 \rightarrow Ca_{(-9)}M_{(-1)}(PO_4)_6(OH,Cl)_{(2)} \qquad (21)$$

TABLE 4

| | Concentration of Dissolved Metal in mg/l | | |
|---|---|---|---|
| Time | Mn | Cd | Pb |
| 0 | 120 | 285 | 465 |
| 2 hr | bld | 255 | bld |
| 1 wk | bld | bld | bld |
| pH (1 wk) | 7.77 | 6.29 | 6.32 |

These data show that tricalcium phosphate is also capable of sequestering heavy metal ions, but that such sequestration also involves the uptake of the anion present. It is believed that this happens because in the absence of anion uptake, hydrochloric acid would be generated in accordance with Equation 22.

$$3Ca_3(PO_4)_2(s)+MCl_2 \rightarrow Ca_{(-9)}M_{(-1)}(PO_4)_6(OH)_2 + 2HCl \qquad (22)$$

The presence of free acid will lower the pH to a value where the apatite is no longer stable. This is observed in the pH vs time curves for the formation of the Pb-containing apatite. The pH rapidly drops to about 4.0 (the approximate lower stability limit for hydroxyapatite). Once this limit is reached, the acidity is neutralized by reaction 23.

$$Ca_{(-9)}M_{(-1)}(PO_4)_6(OH)_2+2HCl \rightarrow Ca_{(-9)}M_{(-1)}(PO_4)_6(OH, Cl)_2 \qquad (23)$$

and the pH rises to near neutral. The reactions of interest, therefore, have an intrinsic buffering capacity.

EXAMPLE V

A standard method for evaluation of the ability of a material to sequester a hazardous heavy metal is to carry out the Toxic Compound Leach Procedure (TCLP). In the following tables, results are presented which demonstrate the ability of substituted hydroxyapatite to sequester metal cations, metal oxyanions or metal oxycations.

In order evaluate the monolith containing the hydroxyapatite binder to which heavy metals were secured an analysis employing the TCLP test procedure was performed for a series of samples testing for certain specific heavy metals. TABLES 5 through 7 illustrate the results of these tests.

The TCLP procedure involves taking apatite monoliths made by the present invention and crushing them into sand-sized particles. These particles are then immersed into acetic acid using a liquid-to-solid ratio of 20 to 1. After soaking in the acid, the amount of the toxic heavy metal that has leached from the metal is measured.

The TCLP tests were performed in order to determine the efficiency of lead binding employing hydroxyapatite as the apatite binder. The results are shown in TABLE 5.

Two lead compounds, $PbCl_2$ and $Pb(NO_3)_2$, were separately tested. With each, a dry pre-mix consisting of precursors and compound, was prepared. The $PbCl_2$ was mixed with the apatite precursors in weight percents 21.4 to to 45.4 and $Pb(NO_3)_2$ was mixed with the apatite precursors in weight percents 48.8 and 49.7. The resultant compounds should be solid solutions of the form: $Ca_{10-x}Pb_x(PO_4)_6(OH)_2$. Apatite monoliths were prepared by allowing the precursors to react for 1 week at room temperature. At the end of one week, small amounts of each sample were analyzed by x-ray diffraction to establish that Pb-containing apatites had formed. The apatite samples were then prepared for the TCLP test and after soaking for 12 weeks, the pH of the leachate solution was measured and the lead concentrations determined. The TCLP limit for Pb is 5 mg/l indicating that Pb substituted apatite prepared by the methods of this invention can pass the TCLP test.

TABLE 5

| x | wt % lead-source in dry pre-mix | Concentration of Pb in leachate [mg/L] | pH of Leachate |
|---|---|---|---|
| 1.0 | 21.4/chloride | 0.61 | 5.50 |
| 1.0 | 21.7/chloride | 0.49 | 5.97 |
| 3.0 | 44.5/chloride | 1.21 | 5.18 |
| 3.0 | 45.4/chloride | 0.85 | 5.33 |
| 3.0 | 48.8/nitrate | 1.32 | 5.57 |
| 3.0 | 49.7/nitrate | 0.95 | 5.83 |

The weight percent of lead source is the weight percent of lead in the dry mix, while the leachate lead concentrate is expressed in milligrams per liter.

EXAMPLE VI

TABLE 6 shows the results of carrying out the TCLP test to establish the ability of apatite to immobilize uranium as $UO_2^{2+}$. The uranium salt and the apatite precursors were proportioned such that the extent of $UO_2$ substitution for Ca was 1 in 40 (x=0.25) or 1 in 20 (x=0.5). In one instance, NaF was also added to the system to assess whether substitution of F for OH lowered the solubility. In every instance, the concentration of uranium in the leachate was below the limit of detection by DC plasma spectroscopy. The pH values of the leachate are in the range of 4.79 to 4.61.

TABLE 6

| TCLP results for hydroxyapatite wasteforms which used $(UO)_2(NO_3)2.6H_2O$ as the uranium source are shown in TABLE 6. Compounds should be solid solutions of the form $Ca_{10-x}(UO_2)_x(PO_4)_6(OH)_2$ where F replaces some OH in one instance. | | | |
|---|---|---|---|
| x | wt % uranyl salt in dry pre-mix | Concentration of U in leachate [mg/L] | pH of Leachate |
| 0.25 | 11.0 | bld | 4.73 |
| 0.25-NaF | 11.0 | bld | 4.79 |
| 0.50 | 20.1 | bld | 4.61 |

EXAMPLE VII

In some instances, partial or complete substitution for the phosphate will be required to form apatitic or the apatitic-like compounds which sequester toxic heavy metals or radioactive ions. Monolithic arsenic apatite can be produced by reaction of $Ca_4(PO_4)_2O$ with arsenic acid. TABLE 7 lists the phases produced depending on the ratio with which calcium and arsenate were mixed. The solids listed were obtained by reacting arsenic acid ($H_3AsO_4$) with $Ca(OH)_2$ at room temperature. The objective of the example was not to form a monolith, but rather to identify the compositional range for arsenic apatite stability and to determine the solubilities of the compounds formed. The arsenic apatite formed has the nominal compositions: $Ca_{10}(AsO_4)_6(OH)_2$.

TABLE 7

| Ca (mg/l) | As (mg/l) | molar Ca/As | sol'n pH | Phases Observed by X-ray Diffraction |
|---|---|---|---|---|
| 300 | 400 | 1.4 | 7.99 | $Ca_3(PO_4)_2 \cdot 4H_2O + Ca_3H_2(AsO_4) \cdot 9H_2O$ |
| 280 | 430 | 1.4 | 8.08 | $Ca_3(PO_4)_2 \cdot 4H_2O + Ca_3H_2(AsO_4) \cdot 9H_2O$ |
| 309 | 580 | 1.5 | 7.76 | $Ca_3(PO_4)_2 \cdot 4H_2O$# |
| 360 | 600 | 1.5 | 7.78 | $Ca_3(PO_4)_2 \cdot 4H_2O$# |
| 32 | 2.9 | 1.67 | 11.17 | $Ca_3(PO_4)_2 \cdot 4H_2O$* |
| 31 | 2.6 | 1.67 | 11.18 | $Ca_3(PO_4)_2 \cdot 4H_2O$* |
| 35 | 0.5 | 1.75 | 11.23 | $Ca_4(OH)_2(AsO_4)_2 \cdot 4H_2O + Ca_3(PO_4)_2 \cdot 4H_2O$ |
| 33 | 2.1 | 1.75 | 11.24 | $Ca_4(OH)_2(AsO_4)_2 \cdot 4H_2O + Ca_3(PO_4)_2 \cdot 4H_2O$ |
| 610 | 2.2 | 2.0 | 12.46 | $Ap + Ca_4(OH)_2(AsO_4)_2 \cdot 4H_2O$ |
| 530 | 0.1 | 2.0 | 12.41 | $Ap + Ca_4(OH)_2(AsO_4)_2 \cdot 4H_2O$ |
| 950 | 1.1 | 2.5 | 12.67 | $Ca(OH)_2$ + Arsenate Apatite |
| 1020 | 0.1 | 2.5 | 12.69 | $Ca(OH)_2$ + Arsenate Apatite | wherein AP was an arsinate apatite
*The presence of $Ca_4(OH)_2(AsO_4)_2 \cdot 4H_2O$ is likely; however, it cannot be detected by x-ray diffraction.
The presence of $Ca_3H_2(AsO_4) \cdot 9H_2O$ is likely, however, it cannot be detected by x-ray diffraction.

This example demonstrates that low solubility arsenic-containing compounds having the apatite structure can be produced at low temperature. In this example, the apatite is stabilized either by $Ca(OH)_2$ or by $Ca_4(OH)_2(AsO4)_2 \cdot 4H_2O$. The presence of apatite with either of these solids is a condition of phase invariance. If either of these combinations of solids were treated with acid, the leaching of arsenic would be suppressed by the condition of invariance. For the case of Ap+$Ca(OH)_2$, the $Ca(OH)_2$ would buffer the solution, thereby keeping the arsenic solubility low. For the case of Ap+$Ca_4(OH)_2(AsO_4)_2 \cdot 4H_2O$, the apatite would decompose in favor of the $Ca_4(OH)_2(AsO_4)_2 \cdot 4H_2O$ while still maintaining a low concentration of arsenic in solution.

Finally, the example demonstrates that the $Ca/AsO_4$ ratio in solution should preferably be greater than 1.67 in order to form an apatite phase.

Another beneficial aspect of the present invention is the ability when the identity of the hazardous material to be immobilized is known to select the apatite precursor or apatite-like material precursor so as to achieve maximum immobilization by use of a precursor which will produce an apatite or apatite-like material of minimum solubility. For example, if $Ca_8Pb_2(PO_4)_6(OH)_2$ was less soluble than $Ca_9Pb(PO_4)_6(OH)_2$, the reactants could be selected to produce the former composition. Both of these compositions are "stoichiometric" because in the formula $A_{10}(MO_4)_6X_2$ all of the A sites are filled.

The monolithic wasteform of the present invention may be established with high porosity and may be employed as an inorganic filter, such as an ion exchanger. The monoliths of the present invention preferably have a surface of at least about 150 $m^2$/g. After use, it may be sintered to reduce its size for disposal and to minimize hazardous material release.

It will be appreciated that while various approaches to immobilization, such as (a) preforming calcium deficient apatites or (b) forming stoichiometric apatites or calcium deficient apatites in situ have been disclosed, it will be appreciated that the processes may advantageously be performed in combination with other processes disclosed herein, if desired.

It will be appreciated that the present invention may be employed in binding heavy metals and radioactive materials contained in solution by removing them to create a monolithic structure of desired size and shape for burial and long-term storage. The resultant monolithic structure effectively immobilizes the heavy metals and radioactive wastes and keeps them from contaminating soil, air or water. The preferred initial starting material are (a) precursors capable of reacting at ambient temperature and pressure to form substituted apatite or apatite-like material, or (b) a preformed calcium deficient or apatite-like material component deficient. The resultant monolithic structure has adequate mechanical strength so as to endure prolonged storage under a heavy overburden without being crushed or otherwise undesirably fragmented. The monolithic construction also resists undesirable chemical interaction with the soil or adjacent liquid or gases.

Whereas particular embodiments of the present invention have been described herein for purposes of illustration, it will be appreciated by those skilled in the art that numerous variations of the details may be made without departing from the invention as described in the appended claims.

I claim:

1. A method of creating a hazardous material wasteform comprising providing at least one apatite-like material precursor, introducing said precursor into an aqueous solution containing at least one material selected from the group consisting of toxic heavy metals and radioactive materials, effecting said precursor introduction in sufficient stoichiometric quantities of said precursor to create an apatite-like material, creating by said introduction a monolithic apatite-like crystalline wasteform having said hazardous materials immobilized in said crystalline structure, and effecting by said process creation of a monolithic wasteform which resists leaching of said hazardous material therefrom under the influence of externally applied water.

2. The method of claim 1 including employing an apatite precursor as said apatite-like precursor, creating an apatite as said apatite-like material, and creating said apatite-like crystalline wasteform as an apatite crystalline wasteform.

3. The method of creating a wasteform of claim 2 including employing as said heavy metal at least one metal selected from the group consisting of arsenic, barium, cadmium, chromium, copper, iron, lead, manganese, nonradioactive strontium, uranium[238], vanadium and zinc.

4. The method of claim 1 including employing as said apatite-like material a material having the formula $A_{10}(MO_4)_6X_2$ wherein the A site occupants include at least one material selected from the group consisting of (a) monovalent ions —cesium, sodium, potassium, rubidium, tellurium; (b) divalent ions—calcium, cadmium, barium, europium, iron, lead, manganese magnesium, nickel, tin, strontium, uranium; (c) trivalent ions—bismuth, scandium, tellurium, yttrium, vanadium; (d) tetravalent ions—cerium and thorium; the other members of the genus actinides and the other members of the genus lanthanons; the M site occupants include at least one material selected from the group consisting of aluminum, arsenic, boron, chromium, germanium, manganese, phosphorous, silicon and sulfur, and the X site occupants include at least one material selected from the group consisting of bromine, carbon trioxide, chlorine, CN, fluorine, hydroxyl, iodine, nitric oxide, nitrous oxide, oxygen and sulfur.

5. The method of creating a heavy metal wasteform of claim 2 including establishing said heavy metal containing apatitic structure by creating a stoichiometric apatite in said aqueous solution, and substituting said heavy metals for said calcium in said apatite.

6. The method of creating a heavy metal wasteform of claim 5 including employing said heavy metals in said solution in ionic form.

7. The method of creating a heavy metal wasteform of claim 6 including employing said heavy metals in the form of at least one of cations, anions, oxycations, or oxyanions.

8. The method of creating a heavy metal wasteform of claim 4 including effecting substitution of said hazardous materials at at least two of (a) the A position, (b) the M position, and (c) the X position.

9. A method of creating hazardous material wasteform comprising providing at least one apatite-like material precursor, introducing said precursor into an aqueous solution containing at least one material selected from the group consisting of toxic heavy metals and radioactive materials, effecting said precursor introduction in sufficient stoichiometric quantities of said precursor to create an apatite-like material, creating by said introduction a monolithic apatite-like crystalline wasteform having said hazardous materials immobilized in said crystalline structure, employing an apatite precursor as said apatite-like precursor, creating an apatite as said apatite-like material, creating said apatite-like crystalline wasteform as an apatite crystalline wasteform, and introducing as said precursor a precursor of a deficient apatite.

10. The method of claim 9 including introducing as said precursor a precursor of a calcium deficient apatite.

11. The method of claim 4 including creating a calcium deficient hydroxyapatite deficient at said A position, and sequestering a hazardous material at said A position.

12. The method of creating a heavy metal wasteform of claim 7 including effecting substitution of said oxycations and oxyanions at calcium sites.

13. The method of creating a heavy metal wasteform of claim 1 including employing as said calcium phosphate precursor at least one material selected from the group consisting of $CaO \cdot P_2O_5$, $CaHPO_4$, $CaHPO_4 \cdot 2H_2O$, $Ca_4(PO_4)_2O$, $Ca(H_2PO_4)_2$, $Ca(H_2PO_4)_2 \cdot H_2O$, $H_3PO_4$, $H_3PO_4 \cdot \frac{1}{2}H_2O$, CaO, calcium phosphate glasses, $Ca(OH)_2$ and $CaCO_3$.

14. The method of claim 1 including said hazardous material being at least one radioactive material selected from the group consisting of cobalt[60], cesium, uranium[235], plutonium, strontium, thorium and iodine.

15. A method of creating hazardous material wasteform comprising providing at least one apatite-like material precursor, introducing said precursor into an aqueous solution containing at least one material selected from the group consisting of toxic heavy metals and radioactive materials, effecting said precursor introduction in sufficient stoichiometric quantities of said precursor to create an apatite-like material, creating by said introduction a monolithic apatite-like crystalline wasteform having said hazardous materials immobilized in said crystalline structure, said hazardous material being at least one radioactive material selected from the group consisting of cobalt[60], cesium, uranium[235], plutonium, strontium, thorium and iodine, said radioactive material is uranium[235], and effecting substitution of said uranium at calcium sites.

16. The method of claim 14 including said radioactive material is iodine, and effecting substitution of said iodine at the hydroxy site.

17. The method of claim 2 including maintaining said solution during said process at a pH of at least about 4.

18. The method of claim 2 including performing said method generally at ambient temperature and pressure.

19. The method of claim 18 including establishing said apatite as an hydroxyapatite.

20. The method of claim 2 including substituting F for OH in said apatite.

21. A method of creating a hazardous waste wasteform comprising creating a deficient apatite-like material, introducing said deficient apatite-like material into an aqueous solution containing at least one hazardous material, and immobilizing said hazardous material on a vacant site of said apatite-like material to establish a monolithic apatite-like crystalline wasteform having said hazardous material in said crystalline structure.

22. The method of claim 21 including creating said deficient apatite-like material as a calcium deficient apatite, and immobilizing said hazardous material on said calcium deficient site.

23. The method of claim 21 including employing as said apatite-like material a material having the formula $A_{10}(MO_4)_6X_2$ wherein the A site occupants include at least one material selected from the group consisting of (a) monovalent ions —cesium, sodium, potassium, rubidium, tellurium; (b) divalent ions—calcium, cadmium, copper, barium, europium, iron, lead, manganese magnesium, nickel, tin, strontium, uranium; (c) trivalent ions—bismuth, chromium, iron, scandium, tellurium, yttrium, vanadium; (d) tetravalent ions—cerium and thorium; the other members of the genus actinides and the other members of the genus lanthanons; the M site occupants include at least one material selected from the group consisting of aluminum, arsenic, boron, chromium, germanium, manganese, phosphorous, silicon and sulfur, and the X site occupants include at least one material selected from the group consisting of bromine, carbon trioxide, chlorine, CN, fluorine, hydroxyl, iodine, nitric oxide, nitrous oxide, oxygen and sulfur.

24. The method of creating a hazardous material wasteform of claim 21 including employing as said hazardous material at least one heavy metal selected from the group consisting of arsenic, barium, cadmium, chromium, copper, iron, lead, manganese, nonradioactive strontium, uranium$^{238}$, vanadium and zinc.

25. The method of creating a heavy metal wasteform of claim 22 including employing as said calcium deficient apatite a calcium deficient hydroxyapatite.

26. The method of creating a heavy metal wasteform of claim 25 including employing said heavy metals in said solution in ionic form.

27. The method of creating a heavy metal wasteform of claim 26 including employing said heavy metals in the form of at least one of cations, anions, oxycations and oxyanions.

28. The method of creating a heavy metal wasteform of claim 27 including effecting substitution of said oxycations and oxyanions at the calcium sites.

29. The method of creating a heavy metal wasteform of claim 25 including effecting by said process creation of a monolithic wasteform which resists leaching of said heavy metals therefrom under the influence of externally applied water.

30. The method of creating a heavy metal wasteform of claim 29 including employing as said calcium phosphate precursor at least one material selected from the group consisting of $CaO \cdot P_2O_5$, $CaHPO_4$, $CaHPO_4 \cdot 2H_2O$, $Ca_4(PO_4)_2O$, $Ca(H_2PO_4)_2$, $Ca(H_2PO_4)_2 \cdot H_2O$, $H_3PO_4$, $H_3PO_4 \cdot \tfrac{1}{2}H_2H_2O$, CaO, calcium phosphate glasses, $Ca(OH)_2$ and $CaCO_3$.

31. The method of creating a heavy metal wasteform of claim 22 including creating said calcium deficient apatite by dissolution and precipitation.

32. The method of creating a heavy metal wasteform of claim 31 including employing an acid-base reaction to produce said solid calcium phosphate precursor.

33. The method of creating a heavy metal wasteform of claim 31 including employing direct hydrolysis to produce said solid calcium phosphate precursor.

34. The method of claim 25 including maintaining said solution during said process at a pH of at least about 4.0.

35. The method of claim 34 including maintaining said solution at a pH of about 4.0 to 12.6.

36. The method of claim 23 including performing said method at generally ambient temperature and pressure.

37. The method of claim 23 including substituting F for OH in said apatite.

38. The method of claim 23 including said deficient apatite-like material being deficient at the A position.

39. A solid wasteform comprising a binder having an apatitic-like crystal structure, hazardous materials chemically bonded within the lattice of said apatitic-like binder, and said wasteform being a monolithic crystalline wasteform which is characterized by resistance to leaching of said hazardous material when said wasteform is exposed to water.

40. The solid monolithic wasteform of claim 39 including said apatitic-like crystal structure being an apatite crystal structure.

41. The solid monolithic wasteform of claim 39 including said apatite-like crystal structure having the structure $A_{10}(MO_4)_6X_2$ wherein the A site occupants include at least one material selected from the group consisting of (a) monovalent ions—cesium, sodium, potassium, rubidium, tellurium; (b) divalent ions—calcium, cadmium, barium, europium, iron, lead, manganese magnesium, nickel, tin, strontium, uranium; (c) trivalent ions—bismuth, scandium, tellurium, yttrium, vanadium; (d) tetravalent ions—cerium and thorium; the other members of the genus actinides and the other members of the genus lanthanons; the M site occupants include at least one material selected from the group consisting of aluminum, arsenic, boron, chromium, germanium, manganese, phosphorous, silicon and sulfur, and the X site occupants include at least one material selected from the group consisting of bromine, carbon trioxide, chlorine, CN, fluorine, hydroxyl, iodine, nitric oxide, nitrous oxide, oxygen and sulfur.

42. The solid monolithic wasteform of claim 40 including said apatite having an F substituted at the OH location.

43. The solid monolithic wasteform of claim 41 including at least one heavy metal substituted at the A site.

44. The solid wasteform of claim 40 including said apatitic binder being a hydroxyapatite binder.

45. The solid wasteform of claim 44 including said hazardous material being a heavy metal which is at least one metal selected from the group consisting of arsenic, barium, cadmium, chromium, copper, iron, lead, manganese, nonradioactive strontium, uranium$^{238}$, vanadium and zinc.

46. The solid wasteform of claim 45 including at least some of said heavy metals being immobilized in said hydroxyapatite at calcium sites.

47. The solid wasteform of claim 46 including a monolithic wasteform having a strength of about 1 to 170 MPa.

48. The solid wasteform of claim 40 including said hazardous material being at least one radioactive material selected from the group consisting of cesium, cobalt$^{60}$, uranium$^{238}$, plutonium, strontium$^{90}$ and iodine.

49. A solid wasteform comprising a binder having an apatitic-like crystal structure, hazardous materials chemically bonded within the lattice of said apatitic-like binder, said wasteform being characterized by resistance to leaching of said hazardous material when said form is exposed to water, said apatitic-like crystal structure being an apatite crystal structure, said hazardous material being at least one radioactive material selected from the group consisting of cesium, cobalt$^{60}$, uranium$^{238}$, plutonium, strontium$^{90}$ and iodine, said radioactive material is uranium$^{238}$, and effecting substitution of said uranium$^{238}$ at calcium sites.

50. The solid wasteform of claim 48 including
said radioactive material is iodine, and
effecting substitution of said iodine at the hydroxy site.

51. A method of making filtration media comprising
introducing into an aqueous solution a calcium phosphate precursor to create at least one of a stoichiometric hydroxyapatite and calcium deficient hydroxyapatite, and binding hazardous materials to create a monolithic porous wasteform whereby said monolithic formation may serve as an ion exchanger.

* * * * *